(No Model.) 3 Sheets—Sheet 1.
G. HOOKHAM.
METHOD OF MANUFACTURING FLAT ZIGZAG SPRINGS.
No. 527,856. Patented Oct. 23, 1894.
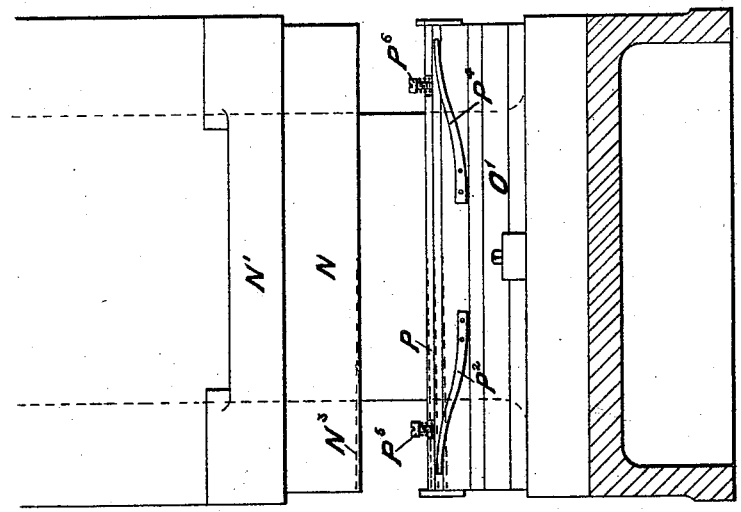
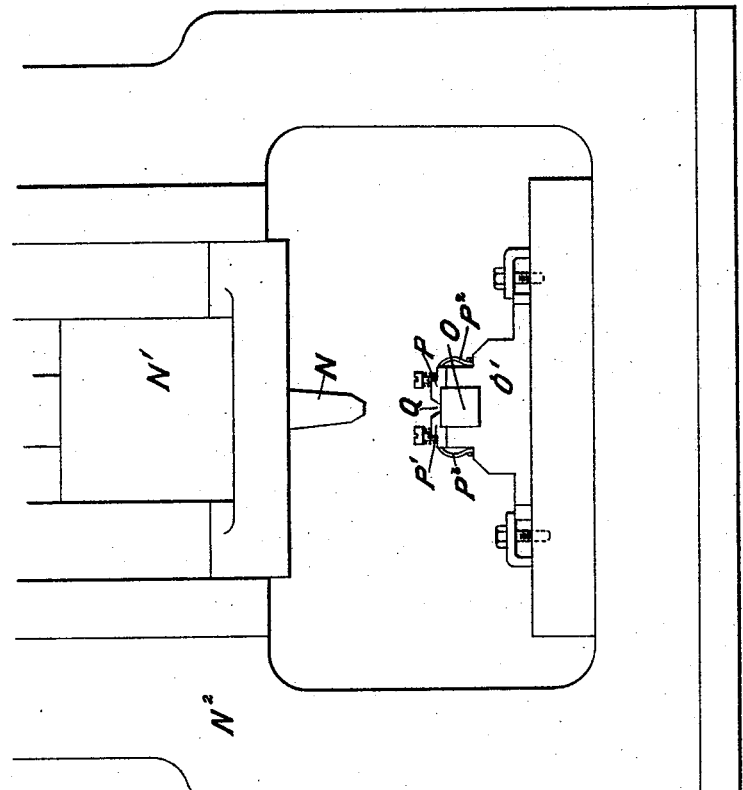
Witnesses:
E. K. Sturtevant
E. A. Scott.
Inventor
George Hookham,
by Richards
Atty.

(No Model.) 3 Sheets—Sheet 2.
G. HOOKHAM.
METHOD OF MANUFACTURING FLAT ZIGZAG SPRINGS.
No. 527,856. Patented Oct. 23, 1894.
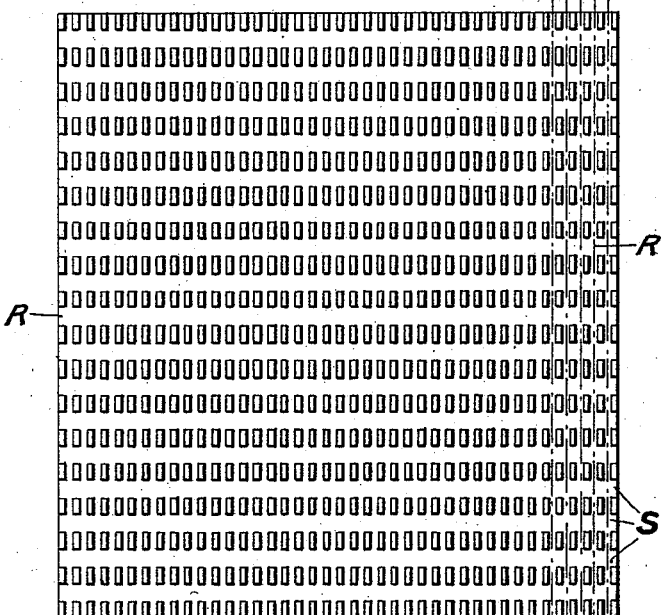
FIG.3
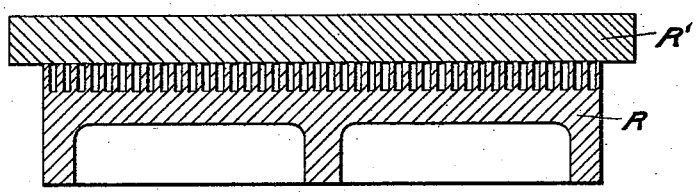
FIG.3ᵃ
  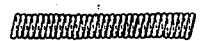
FIG.4   FIG.6
  
FIG.5   FIG.7
FIG.8
Witnesses:
E. K. Sturtevant.
E. A. Scott.
Inventor:
George Hookham
by Richardson
Atty.
THE NORRIS PETERS CO., PHOTO-LITHO., WASHINGTON, D. C.

(No Model.) 3 Sheets—Sheet 3.

G. HOOKHAM.
METHOD OF MANUFACTURING FLAT ZIGZAG SPRINGS.

No. 527,856. Patented Oct. 23, 1894.

Witnesses:—
E. K. Sturtevant
E. A. Scott

Inventor:—
George Hookham,
by Richardson
attys.

UNITED STATES PATENT OFFICE.

GEORGE HOOKHAM, OF BIRMINGHAM, ENGLAND.

METHOD OF MANUFACTURING FLAT ZIGZAG SPRINGS.

SPECIFICATION forming part of Letters Patent No. 527,856, dated October 23, 1894.

Application filed May 24, 1894. Serial No. 512,321. (No specimens.)

*To all whom it may concern:*

Be it known that I, GEORGE HOOKHAM, a subject of the Queen of Great Britain, residing at Birmingham, Warwick county, England, have invented an Improved Metallic Spring and Method of Making the Same, of which the following is a specification.

My invention relates to the method of manufacturing flat zigzag springs by stamping or pressing spiral springs to flat form and then straightening them by heat while held in straight grooves.

Figure 9:
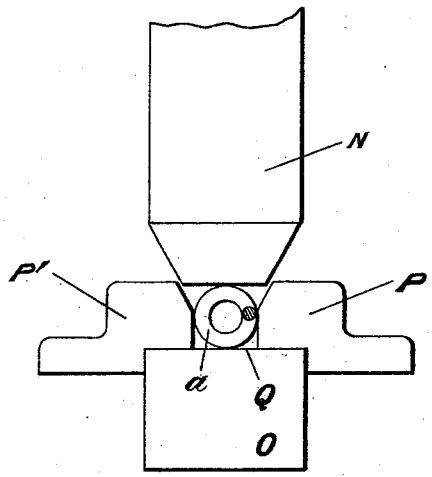
Figure 10:
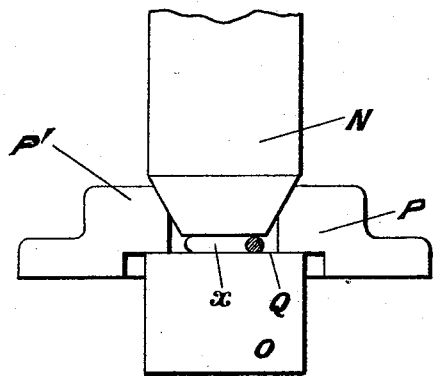

Referring to the three sheets of accompanying drawings:—Figure 1 is an end elevation of part of a machine for manufacturing flat zig-zag and other springs formed from helices. Fig. 2 is a side elevation corresponding to Fig. 1. Fig. 3 is a plan and Fig. 3ᴬ a transverse section of a device for straightening and tempering springs. Fig. 4 is a helical spring before treatment in the machine shown at Figs. 1 and 2. Fig. 5 is a flat zig-zag spring produced from Fig. 4. Fig. 6 is a flattened close coiled helix in which the coils are flattened and cross each other. Fig. 7 is a flat zig-zag produced from a helix coiled closer than shown at Fig. 4. Fig. 8 is a double spring produced from two springs such as shown at Fig. 5. End elevations are shown at each of the Figs. 4, 5, 6, 7 and 8. Fig. 9 is an enlarged end view of the pressing tool and die showing the position when the tool just touches the spring. Fig. 10 is a similar end view showing the spring pressed flat and the side guides moved to their out position.

In manufacturing springs of flat zig-zag formation I first coil a helix in any usual manner, and if the coils are close I open them out to the desired extent by winding from a drum of lower to one of higher circumferential velocity, and I proportion the velocities to give the required amount of opening.

If the zig-zags are required to be a considerable distance apart I open the helix to a corresponding pitch. I cut the opened helix into suitable lengths and introduce each length into a straight recess Q Fig. 1, having sides P P' Figs. 1, 2, 9 and 10, which sides are pressed in by springs as P² P³ P⁴ and slide on a square of hard steel O fitted in a recess in the strong die block O'. The die block O' is arranged under the stamping tool N which tool is carried by the slide N' of a powerful press. N² is part of the frame of the said press. I then operate the stamping press and cause the stamping or pressing tool N to flatten out the helix, and I usually apply sufficient pressure to also flatten out the wire of which it is composed. The top or press tool N opens the spring sides or guides P P' in its descent. I find that by so flattening a helix which has been made of a sufficiently open pitch, the wires do not cross each other, but form a flat zig-zag in which the wire is bent alternately backward and forward in the same plane.

Figs. 9 and 10 show on a larger scale two positions of the pressing tool and the spring operated guides. In Fig. 9 the press tool N just touches the helix $a$, and inclined surfaces on the lower end of the tool N come nearly into contact with similar inclined surfaces on the spring sides or guides P P'. The said spring sides or guides thus hold the helix in position till it is gripped by the press tool N in its descent, and the said press tool then pushes out the spring sides or guides P P' partly by the incline and partly by the action of the helix $a$, in the process of being flattened. In Fig. 10 the press tool N is shown at the bottom of its stroke after squeezing the spring $a$, to a flat zig-zag $x$, and clearing away the side guides P P'. The flat face of the press tool N is made sufficiently broad to extend a little past the extreme width of the zig-zag $x$, when fully flattened out.

When removed from the press the length of zig-zag is generally a little bent, and twisted, which bending is caused by the tool pressing a little harder on one of the edges than the other. To straighten, I place a number of lengths in a grooved case having straight grooves and a cover. The grooves fit the lengths and hold them straight while the cover retains the lengths in the grooves. Such a case R is shown in plan with the cover removed at Fig. 3, where $x$, $x$, $x$, $x$, $x$, are lengths laid in the grooves. These grooves may be continuous or may be cut across by other grooves S, which may be formed as shown at Fig. 3. Fig. 3ᴬ is a transverse section through the case R showing a cover R' which may be a simple plate of metal. I heat the case, so filled with zig-zag lengths, by gas or other means to a regulated temperature for a time, and then allow the case with its contents to cool. If the case has been heated to a sufficient temperature for a long enough period the lengths become perfectly straight.

The temperature used depends on the material of the springs. In the case of steel I so adjust the temperature that the springs color, ranging beyond light blue.

I find the elastic qualities of the springs greatly improved by this heating to a proper temperature. The separate lengths of zigzag spring may be finished by tipping the ends with soft metal or they may be used without such tipping. The flattening operation may be accomplished in a press of any known construction, but the tool must be effectively guided to press uniformly lengthwise and sidewise upon the coil.

A continuous process of flattening may be adopted in which the press tools are arranged with sloping ends to enable the work to be fed up in a continuous length. Such a slope applied to the press tool N, is indicated by the dotted lines $N^3$ Fig. 2.

The straightening process may be carried into effect by heating the lengths while held in slight tension and the grooves in the case may be such as to allow each groove to hold several spring lengths.

Figs. 4, 5, 6, 7 and 8 illustrate plan and end views of a slightly enlarged scale of the various stages and products produced by treating helices under the press tool as hereinbefore described.

In carrying my invention into effect according to another modification I prepare zigzag lengths as shown in Fig. 5 from right and left hand helices, straighten the said lengths and slip the opposing zig-zags together so as to cause the two lengths to interlock edgewise. I then introduce the double spring so formed under the press tool and give it a squeeze. This squeeze flattens out the wire further and causes the separate pieces to interlock so completely as to become one piece. Such a piece is illustrated in plan and end elevation at Fig. 8.

My invention may also be carried into effect as applied to a helix prepared from strip, ribbon or wire. I close coil a strip, ribbon or wire helix of any desired pitch which I may cut into lengths, which lengths I flatten in a press as described, but in this case I produce a flattened helix in which the strip or wire lies in two different planes. The two sides of the coil are forced into contact with each other and form a flat spring strip or almost continuous flat surface, but having far greater elasticity than a straight metal strip such as is commonly used in ladies' dresses.

Long strips may be treated continuously under the press.

Having now particulary described and ascertained the nature of my said invention and in what manner the same is to be performed, I declare that what I claim is—

1. The herein described method of making flat zigzag springs consisting in first forming a helix flattening the same to make the zigzag formation and then straightening the flattened spring by confining the same in straight grooves and heating it, substantially as described.

2. The herein described method of straightening flat zigzag springs consisting in confining the same in straight grooves and then heating the same while so held, substantially as described.

In witness whereof I have hereunto set my hand in presence of two witnesses.

GEORGE HOOKHAM.

Witnesses:
SYDNEY W. MORGAN,
HARRY LANGSLOW,
Clerks to C. E. Mathews, Solicitor and Notary Public, Birmingham.